UNITED STATES PATENT OFFICE.

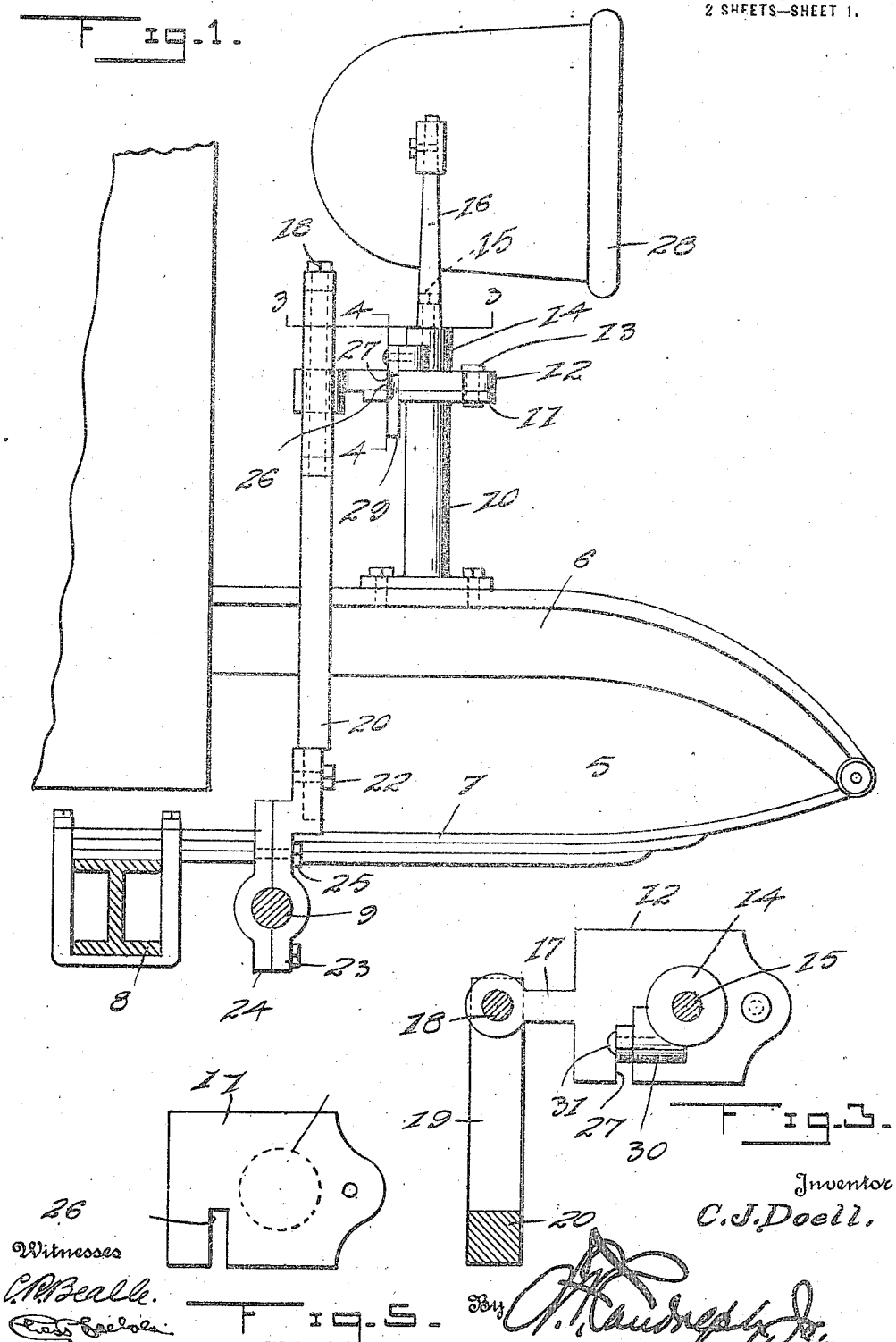

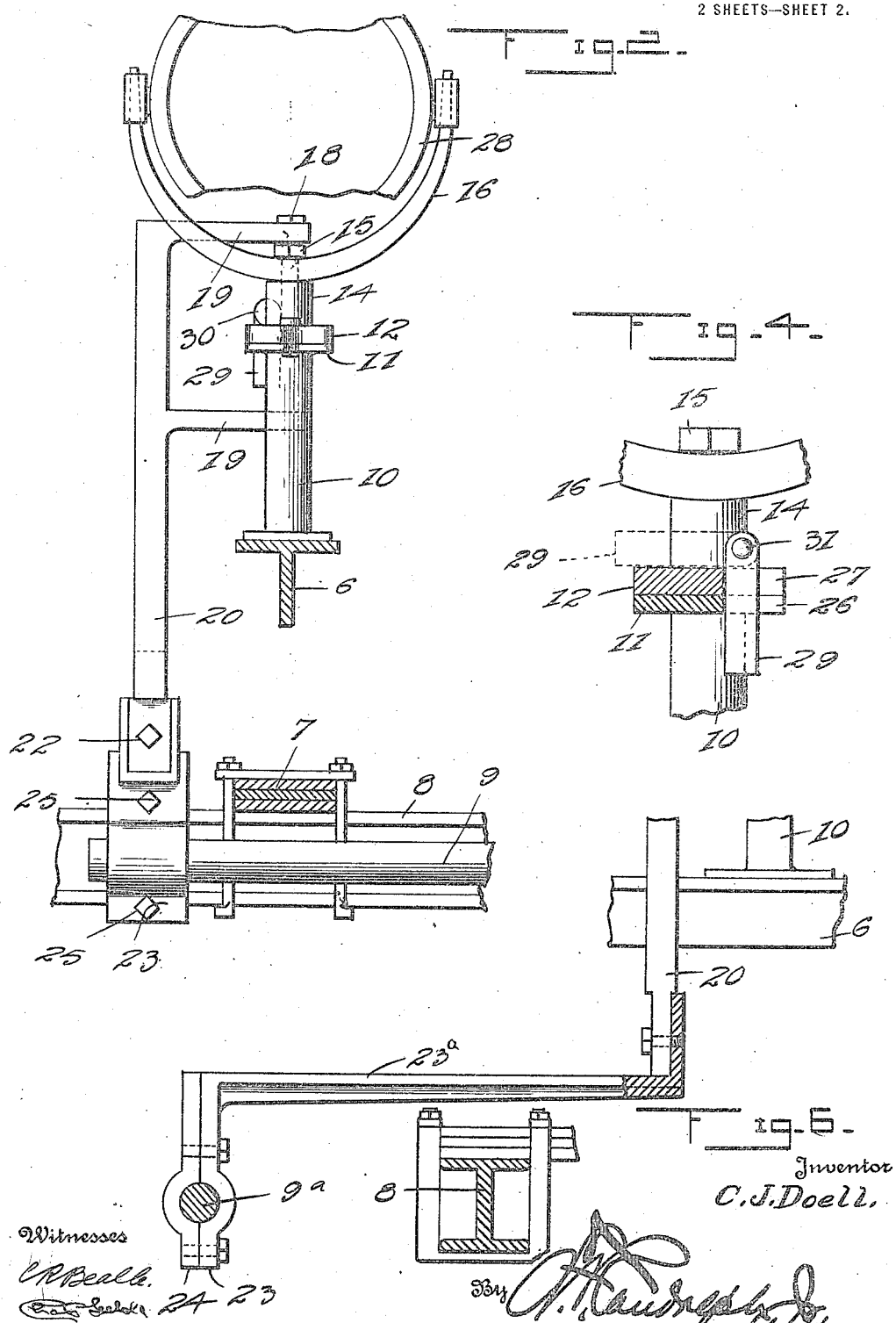

CHARLES J. DOELL, OF ROCHESTER, NEW YORK.

DIRIGIBLE HEADLIGHT.

1,166,337.  Specification of Letters Patent.  Patented Dec. 28, 1915.

Application filed September 14, 1915. Serial No. 50,672.

*To all whom it may concern:*

Be it known that I, CHARLES J. DOELL, a citizen of the United States, residing at Rochester, in the county of Monroe and State of New York, have invented certain new and useful Improvements in Dirigible Headlights; and I do hereby declare the following to be a full, clear, and exact description of the invention, such as will enable others skilled in the art to which it appertains to make and use the same.

This invention relates to dirigible headlights and more particularly to a novel and efficient apparatus specially designed for use in connection with motor vehicles for controlling the headlights thereof.

The invention has for its primary object to provide a dirigible headlight for motor vehicles including essentially a pivoted lamp support and means connecting the support with a reach rod connecting the steering wheels of the motor vehicle whereby the lamps and wheels are simultaneously and synchronously moved.

Another object is the provision of means for locking the lights against movement.

With these and other objects in view, the invention consists in the novel construction, arrangement and formation of parts as will be hereinafter specifically described, claimed and illustrated in the accompanying drawings, in which, Figure 1 represents a fragmental side elevation of a motor vehicle, partly in section, illustrating the improved dirigible headlight applied to use, Fig. 2 represents a fragmental sectional view of a vehicle illustrating the dirigible headlight in front elevation, Fig. 3 represents a horizontal sectional view on the line 3—3 of Fig. 1, Fig. 4 represents a detail sectional view on the line 4—4 of Fig. 1, Fig. 5 represents a plan of the pivoted lamp supporting plate removed, Fig. 6 represents a detail view, partly broken away of a modified type of dirigible headlight.

Referring to the drawings in detail wherein similar reference numerals designate corresponding parts throughout the several views, the numeral 5 designates generally a fragment of the vehicle body including the longitudinal members 6 of the frame supported upon springs 7 which latter are supported upon the front axle 8. The steering arms of the front wheels, not shown, are connected by the usual reach rod 9 arranged forwardly of and in parallel relation with the front axle.

A post or standard 10 is rigidly bolted to each longitudinal member of the vehicle chassis forwardly of the radiator and is provided with an upper flanged end 11.

A plate 12 is pivotally secured to the forward portion of the flange 11 by a bolt 13 and is formed centrally with a boss 14 having an internally screw threaded aperture receiving a bolt 15 whereby a lamp supporting bracket 16 is rigidly secured to the plate.

An extension 17 is formed integral with the rear extremity of the plate 12 and is apertured to slidably and pivotally receive a removable bolt 18, the latter being secured at its outer ends in a pair of laterally projecting elongated arms 19 of a connecting rod 20. The lower extremity of the connecting rod 20 terminates above and slightly forwardly of the reach rod 9 and is rigidly secured by a bolt 22 to one part 23 of a clamping or attaching element including also a second part 24 adapted to be rigidly clamped upon and slidably engaged with the reach rod 9 by bolts 25.

The flange 11 and plate 12 are formed with recesses 26 and 27, respectively which are adapted, when the headlight 28 is directed forwardly, to be moved into coincidence for the reception of a pivoted latch 29. The boss 14 is formed with an integral ear 30 in which is secured a pin 31 constituting a pivotal support for the latch 29. When not in use, the latch 29 is swung back and supported upon the plate 12 as illustrated in dotted lines in Fig. 4.

In operation the headlight 28 is moved simultaneously and synchronously with the steering wheels of the vehicle by the reach rod 9. The movement of said reach rod is transmitted to the headlight through the connecting rod 20, plate and extension 12 and 17 and bracket 16. The relative movement of the axle 8 and frame structure 6 upon which the lamp is supported is compensated for by the sliding connection between the plate 12 and bolt 18. When it is desired to lock the lamp or headlight in forwardly directed position the bolt 18 is removed so as to permit free movement of the plate 12 with relation to the connecting rod 20 and the latch 29 is swung downwardly as illustrated in Fig. 1 so as to engage in the recesses 26 and 27, thus locking the pivoted plate 12 and consequently the lamp or headlight 28 against pivotal movement.

Referring to the modification of the invention illustrated in Fig. 6, the numeral 8 illustrates a front axle of a slightly different type of vehicle from that illustrated in Fig. 1 and in which the reach rod connecting the steering arms of the front wheels is arranged rearwardly of the axle. In this type of dirigible headlight the connecting rod 20 is connected with a forwardly directed angular extension 23$^a$ of the forward clamping member 23 which is adapted to coöperate with the rear clamping member 24 to rigidly connect the rod 20 with the reach rod 9$^a$.

What is claimed is:—

1. A dirigible headlight including a supporting post, a plate pivotally secured to the upper extremity of said post, a boss formed integral with said pivoted plate having an internally screw threaded aperture, a lamp bracket positioned upon said boss and a bolt engaged in said threaded aperture to secure said bracket in position upon said boss.

2. A dirigible headlight including a post, a flange formed integral with the upper extremity of said post, a plate slidably engaged with said flange, means pivotally securing said plate to said flange, a lamp bracket carried by said plate, and means to lock said plate against pivotal movement upon said flange.

3. A dirigible headlight including a relatively stationary post, a flange at the upper end of said post, a plate pivotally secured to said flange, said plate and flange having recesses therein adapted to be moved into registration, and a latch pivotally secured to said plate adapted to engage in said recesses to lock the plate against pivotal movement.

4. A dirigible headlight including a post, a plate pivotally secured to said post, means to lock said plate against pivotal movement, a lamp bracket carried by said plate, a connecting rod, a pair of spaced arms carried by said connecting rod, a bolt secured in said arms having sliding engagement with said plate, and means for clamping the lower extremity of said rod with the steering gear of a motor vehicle.

5. A dirigible headlight including a post, a plate pivotally secured to said post, means to lock said plate against pivotal movement, a lamp bracket carried by said plate, a connecting rod, a pair of spaced elongated arms carried by said connecting rod, a removable bolt secured in said arms having sliding engagement with said plate, and means for clamping the lower extremity of said rod with the steering gear of a motor vehicle.

In testimony whereof I affix my signature in presence of two witnesses.

CHARLES J. DOELL.

Witnesses:
 CHAS. S. COOK,
 HENRY F. KURTZ.